(12) United States Patent
Seo et al.

(10) Patent No.: US 9,635,648 B2
(45) Date of Patent: Apr. 25, 2017

(54) METHOD FOR TRANSMITTING/RECEIVING DOWNLINK CONTROL INFORMATION IN WIRELESS COMMUNICATION SYSTEM AND DEVICE THEREFOR

(75) Inventors: Hanbyul Seo, Anyang-si (KR); Hakseong Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 344 days.

(21) Appl. No.: 14/115,301

(22) PCT Filed: Apr. 18, 2012

(86) PCT No.: PCT/KR2012/002931
§ 371 (c)(1),
(2), (4) Date: Nov. 1, 2013

(87) PCT Pub. No.: WO2012/150773
PCT Pub. Date: Nov. 8, 2012

(65) Prior Publication Data
US 2014/0064235 A1 Mar. 6, 2014

Related U.S. Application Data

(60) Provisional application No. 61/482,188, filed on May 3, 2011, provisional application No. 61/509,548, filed (Continued)

(51) Int. Cl.
*H04W 72/04* (2009.01)
*H04L 5/00* (2006.01)
*H04L 27/26* (2006.01)

(52) U.S. Cl.
CPC ....... *H04W 72/0406* (2013.01); *H04L 5/0048* (2013.01); *H04L 5/0053* (2013.01); *H04L 27/2613* (2013.01)

(58) Field of Classification Search
CPC ........... H04W 72/042; H04W 72/0413; H04W 72/0446; H04W 72/0406;
(Continued)

(56) References Cited

U.S. PATENT DOCUMENTS

2010/0303034 A1* 12/2010 Chen ..................... H04L 5/0023 370/329
2010/0323709 A1* 12/2010 Nam ..................... H04B 7/043 455/450

(Continued)

FOREIGN PATENT DOCUMENTS

| CA | 2768349 A1 | 1/2011 |
| CA | 2775479 A1 | 3/2011 |

(Continued)

*Primary Examiner* — Charles C Jiang
*Assistant Examiner* — Rose Clark
(74) *Attorney, Agent, or Firm* — Birch, Stewart, Kolasch & Birch, LLP

(57) ABSTRACT

Disclosed in the present invention is a method for a terminal to receive downlink control information from a base station in a wireless communication system. More particularly, the present invention comprises the steps of receiving control information in a first area of a specific subframe on the basis of a first reference signal, receiving control information in a second area of the specific subframe on the basis of a second reference signal, wherein the first reference signal and the second reference signal are applied to a same precoding.

16 Claims, 10 Drawing Sheets

Related U.S. Application Data on Jul. 19, 2011, provisional application No. 61/556,769, filed on Nov. 7, 2011, provisional application No. 61/598,309, filed on Feb. 13, 2012.

(58) Field of Classification Search
CPC .... H04L 5/0048–5/0053; H04L 5/0035; H04L 5/0007; H04L 5/0091–5/0098
See application file for complete search history.

(56) References Cited

U.S. PATENT DOCUMENTS

| | | | |
|---|---|---|---|
| 2011/0044250 A1* | 2/2011 | Han | H04B 7/0689 370/328 |
| 2011/0064159 A1 | 3/2011 | Ko et al. | |
| 2011/0085503 A1* | 4/2011 | Nam | H04W 72/042 370/329 |
| 2012/0051319 A1 | 3/2012 | Kwon et al. | |
| 2012/0057562 A1 | 3/2012 | Kim et al. | |
| 2012/0275414 A1* | 11/2012 | Hu | H04B 7/0452 370/329 |

FOREIGN PATENT DOCUMENTS

| | | |
|---|---|---|
| KR | 10-2010-0124677 A | 11/2010 |
| KR | 10-2011-0007977 A | 1/2011 |
| KR | 10-2011-0029063 A | 3/2011 |
| WO | WO 2010/120106 A2 | 10/2010 |
| WO | WO 2011/021852 A2 | 2/2011 |

\* cited by examiner

FIG. 2
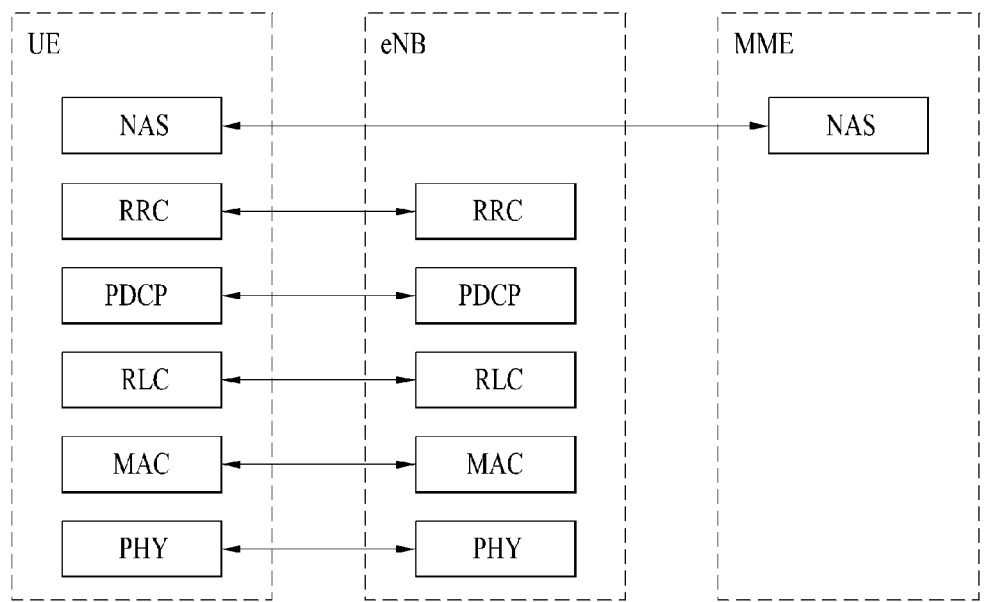
(a) control-plane protocol stack
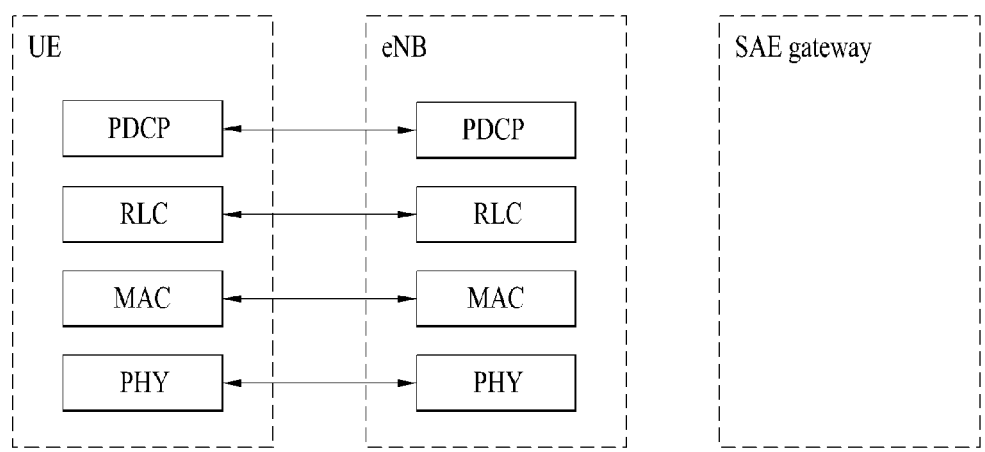
(b) user-plane protocol stack

METHOD FOR TRANSMITTING/RECEIVING DOWNLINK CONTROL INFORMATION IN WIRELESS COMMUNICATION SYSTEM AND DEVICE THEREFOR

This application is the National Phase of PCT/KR2012/002931 filed on Apr. 18, 2012, which claims priority under 35 U.S.C. 119(e) to U.S. Provisional Application No. 61/482,188 filed on May 3, 2011, 61/509,548 filed on Jul. 19, 2011, 61/556,769 filed on Nov. 7, 2011 and 61/598,309 filed on Feb. 13, 2012, all of which are hereby expressly incorporated by reference into the present application.

TECHNICAL FIELD

The present invention relates to a wireless communication system, and more particularly, to a method for transmitting and receiving downlink control information in a wireless communication system, and a device therefor.

BACKGROUND ART

A $3^{rd}$ generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a mobile communication system. The E-UMTS is an evolved version of the conventional UMTS, and its basic standardization is in progress under the 3rd Generation Partnership Project (3GPP). The E-UMTS may also be referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS includes a User Equipment (UE), a base station (eNode B; eNB), and an Access Gateway (AG) which is located at an end of a network (E-UTRAN) and connected to an external network. Generally, the base station may simultaneously transmit multiple data streams for a broadcast service, a multicast service and/or a unicast service.

One or more cells may exist for one base station. One cell is set to one of bandwidths of 1.25, 2.5, 5, 10, and 20 MHz to provide a downlink or uplink transport service to several user equipments. Different cells may be set to provide different bandwidths. Also, the base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment UE. The AG manages mobility of the user equipment UE on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure, open type interface, proper power consumption of the user equipment, etc. are required.

DISCLOSURE

Technical Problem

Based on aforementioned discussion, an object of the present invention devised to solve the conventional problem is to provide a method for transmitting downlink control information in a wireless communication system, and a device therefor.

Technical Solution

According to one embodiment of the present invention, a method for allowing a user equipment to receive downlink control information from a base station in a wireless communication system comprises the steps of receiving control information in a first area of a specific subframe based on a first reference signal; and receiving control information in a second area of the specific subframe based on a second reference signal, wherein a same precoding is applied to the first reference signal and the second reference signal. Preferably, the method further comprises the step of performing channel estimation for the second area by combining the first reference signal and the second reference signal.

According to another embodiment of the present invention, a user equipment in a wireless communication system comprises a wireless communication module configured to transmit and receive a signal to and from a base station; and a processor configured to process the signal, wherein the processor controls the wireless communication module to receive control information in a first area of a specific subframe based on a first reference signal and receiving control information in a second area of the specific subframe based on a second reference signal, and a same precoding is applied to the first reference signal and the second reference signal. Preferably, the processor performs channel estimation for the second area by combining the first reference signal and the second reference signal.

In the above embodiments, an antenna port for defining the first reference signal is different from an antenna port for defining the second reference signal, and spatial resources allocated to each of the control information received in the first area and the control information received in the second area are same as each other.

Moreover, the first reference signal and the second reference signal are mapped into a predetermined area of the specific subframe through code division multiplexing.

Also, the control information received in the first area and the control information received in the second area correspond to one downlink control information. Alternatively, each of the control information received in the first area and the control information received in the second area corresponds to separate downlink control information for the user equipment.

More preferably, the first area and the second area may be included in one resource block pair. Otherwise, the first area may be a first slot of the specific subframe, and the second area may be a second slot of the specific subframe. Otherwise, the first area and the second area may be resource blocks adjacent to each other or spaced apart from each other in a unit of a predetermined number of resource blocks (RBs). In this case, the unit of a predetermined number of resource blocks (RBs) corresponds to one resource block or two resource blocks.

Advantageous Effects

According to the embodiments of the present invention, the base station in the wireless communication system may effectively transmit downlink control information while avoiding inter-cell interference.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

FIG. 2 is a diagram illustrating structures of a control plane and a user plane of a radio interface protocol between a user equipment and an E-UTRAN based on the 3GPP radio access network standard;

BEST MODE FOR CARRYING OUT THE INVENTION

Figure 1:
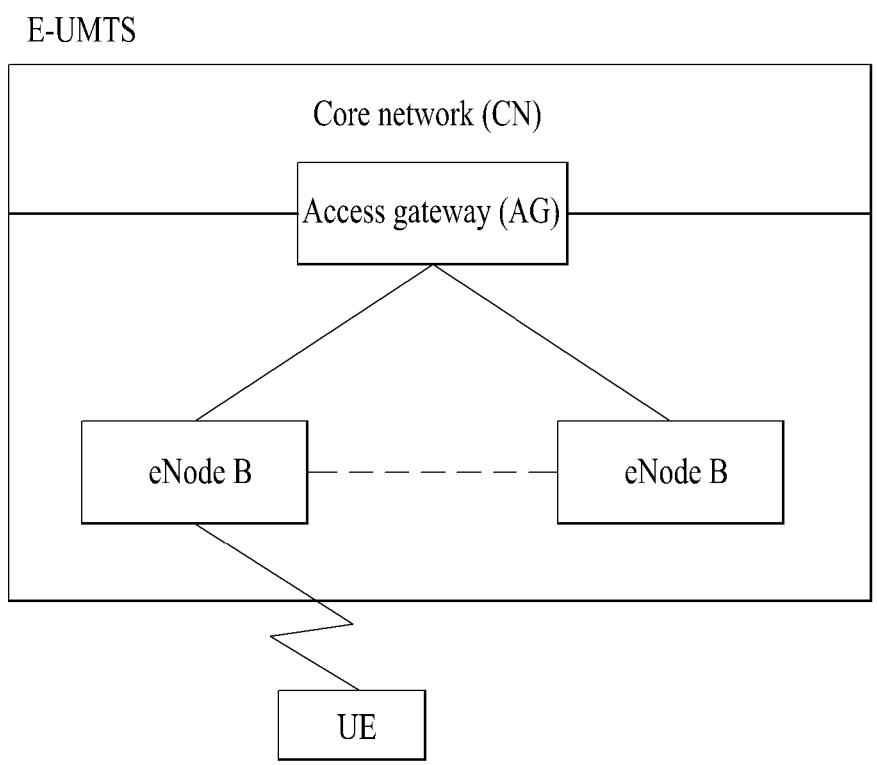
FIG. 1 is a diagram illustrating a network structure of an Evolved Universal Mobile Telecommunications System (E-UMTS), which is an example of a wireless communication system.

Hereinafter, structures, operations, and other features of the present invention will be understood readily by the preferred embodiments of the present invention, examples of which are illustrated in the accompanying drawings. Embodiments described later are examples in which technical features of the present invention are applied to 3GPP system.

Although the embodiment of the present invention will be described based on the LTE system and the LTE-A system in this specification, the LTE system and the LTE-A system are only exemplary, and the embodiment of the present invention may be applied to all communication systems corresponding to the aforementioned definition.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer (PHY) is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.25, 2.5, 5, 10, 15, and 20 Mhz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
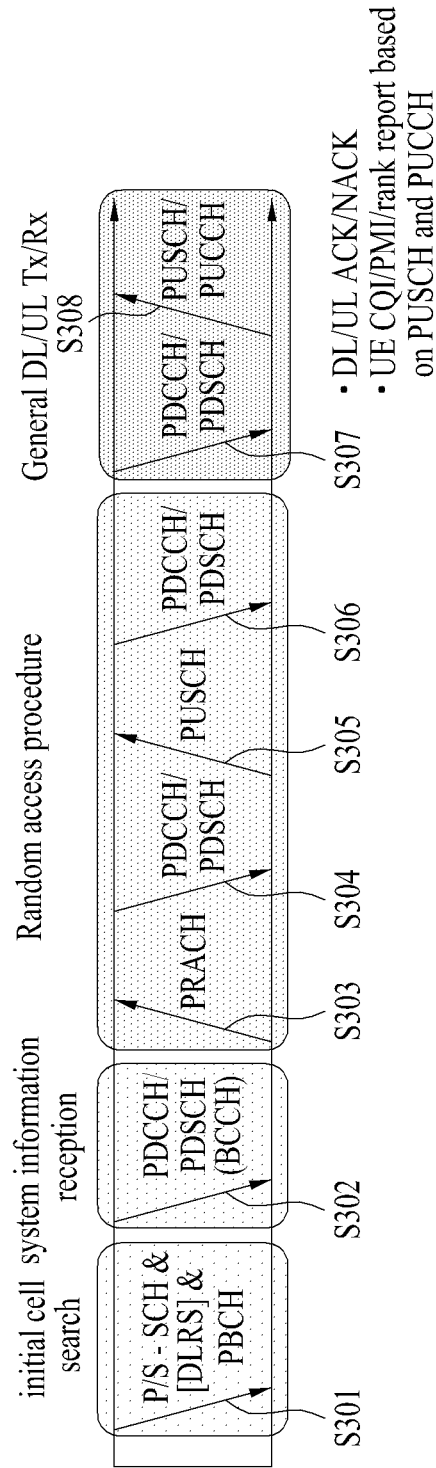
FIG. 3 is a diagram illustrating physical channels used in a 3GPP system and a general method for transmitting a signal using the physical channels.

FIG. 3 is a diagram illustrating physical channels used in a 3GPP system and a general method for transmitting a signal using the physical channels.

The user equipment performs initial cell search such as synchronizing with the base station when it newly enters a cell or the power is turned on (S301). To this end, the user equipment may synchronize with the base station by receiving a primary synchronization channel (P-SCH) and a secondary synchronization channel (S-SCH) from the base station, and may acquire information of cell ID, etc. Afterwards, the user equipment may acquire broadcast information within the cell by receiving a physical broadcast channel (PBCH) from the base station. In the mean time, the user equipment may identify the status of a downlink channel by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH (S302).

In the meantime, if the user equipment initially accesses the base station, or if there is no radio resource for signal transmission, the user equipment may perform a random access procedure (RACH) for the base station (S303 to S306). To this end, the user equipment may transmit a preamble of a specific sequence through a physical random access channel (PRACH) (303 and S305), and may receive a response message to the preamble through the PDCCH and the PDSCH corresponding to the PDCCH (S304 and S306). In case of a contention based RACH, a contention resolution procedure may be performed additionally.

The user equipment which has performed the aforementioned steps may receive the PDCCH/PDSCH (S307) and transmit a physical uplink shared channel (PUSCH) and a physical uplink control channel (PUCCH) (S308), as a general procedure of transmitting uplink/downlink signals. In particular, the user equipment receives downlink control information (DCI) through the PDCCH. In this case, the DCI includes control information such as resource allocation information on the user equipment, and has different formats depending on its usage.

In the meantime, the control information transmitted from the user equipment to the base station or received from the base station to the user equipment through the uplink includes downlink/uplink ACK/NACK signals, a channel quality indicator (CQI), a precoding matrix index (PMI), a scheduling request (SR), and a rank indicator (RI). In case of the 3GPP LTE system, the user equipment may transmit the aforementioned control information such as CQI/PMI/RI through the PUSCH and/or the PUCCH.

Figure 4:
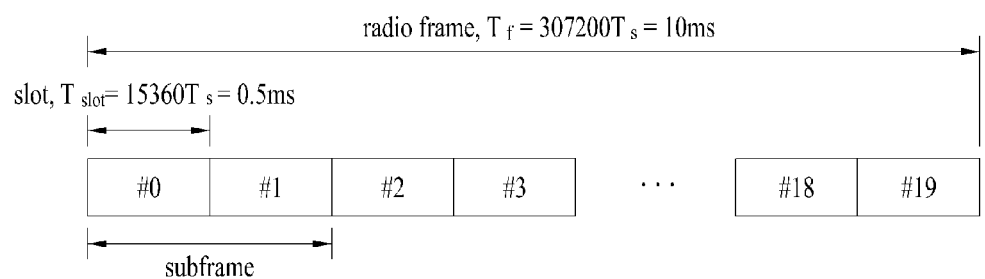
FIG. 4 is a diagram illustrating a structure of a radio frame used in an LTE system.

FIG. 4 is a diagram illustrating a structure of a radio frame used in an LTE system.

Referring to FIG. 4, a radio frame has a length of 10 ms ($327200 \times T_s$) and includes ten (10) subframes of an equal size. Each sub frame has a length of 1 ms and includes two slots. Each slot has a length of 0.5 ms ($15360T_s$). In this case, $T_s$ represents a sampling time, and is expressed by $T_s=1/(15 \text{ kHz} \times 2048)=3.2552 \times 10^{-8}$ (about 33 ns). The slot includes a plurality of orthogonal frequency division multiplexing (OFDM) symbols or single carrier-frequency division multiple access (SC-FDMA) symbols in a time domain, and includes a plurality of resource blocks (RBs) in a frequency domain. In the LTE system, one resource block includes twelve (12) subcarriers×seven (or six) OFDM symbols or SC-FDMA symbols. A transmission time interval (TTI), which is a transmission unit time of data, may be determined in a unit of one or more subframes. The aforementioned structure of the radio frame is only exemplary, and various modifications may be made in the number of subframes included in the radio frame or the number of slots included in the subframe, or the number of OFDM symbols or SC-FDMA symbols included in the slot.

Figure 5:
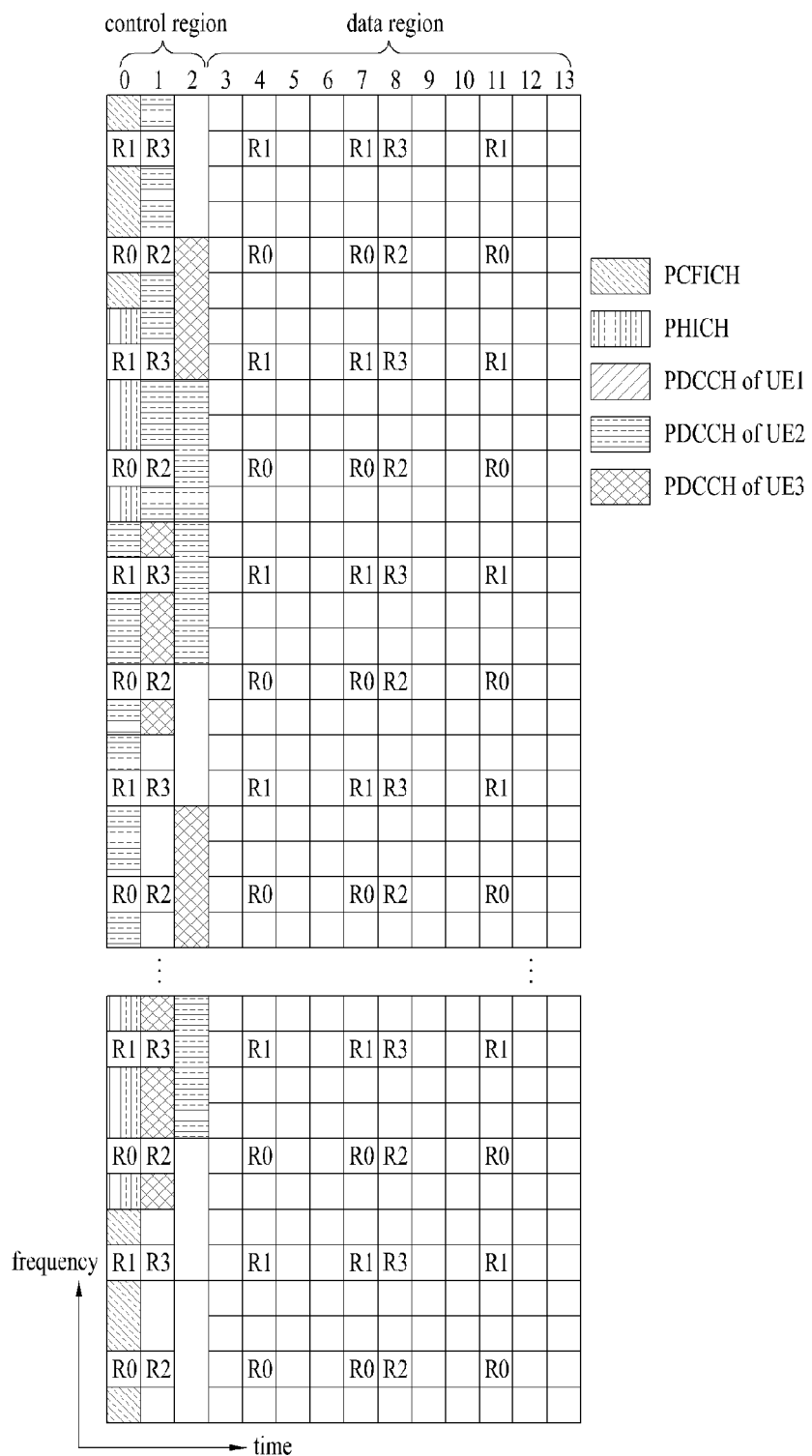
FIG. 5 is a diagram illustrating a structure of a downlink radio frame used in an LTE system.

FIG. 5 is a diagram illustrating a control channel included in a control region of one subframe in a downlink radio frame.

Referring to FIG. 5, the subframe includes fourteen (14) OFDM symbols. First one to three OFDM symbols are used as the control region in accordance with subframe configuration, and the other thirteen to eleven OFDM symbols are used as the data region. In FIG. 5, R1 to R4 represent reference signals (RS) (or pilot signals) of antennas 0 to 3. The RS is fixed by a given pattern within the subframe regardless of the control region and the data region. The control channel is allocated to a resource to which the RS is not allocated in the control region, and a traffic channel is also allocated to a resource to which the RS is not allocated in the data region. Examples of the control channel allocated to the control region include a Physical Control Format Indicator Channel (PCFICH), a Physical Hybrid-ARQ Indicator Channel (PHICH), and a Physical Downlink Control Channel (PDCCH).

The PCFICH notifies the user equipment of the number of OFDM symbols used in the PDCCH per subframe. The PCFICH is located in the first OFDM symbol and configured prior to the PHICH and the PDCCH. The PCFICH includes four resource element groups (REG), each REG being distributed in the control region based on cell identity (cell ID). One REG includes four resource elements (REs). The RE represents a minimum physical resource defined by one subcarrier×one OFDM symbol. The PCFICH value indicates a value of 1 to 3 or a value of 2 to 4 depending on a bandwidth, and is modulated by Quadrature Phase Shift Keying (QPSK).

The PHICH is a physical hybrid-automatic repeat and request (HARQ) indicator channel and is used to carry HARQ ACK/NACK signals for uplink transmission. Namely, the PHICH represents a channel where DL ACK/NACK information for UL HARQ is transmitted. The PHICH includes one REG, and is cell-specifically scrambled. The ACK/NACK signals are indicated by 1 bit, and are modulated by binary phase shift keying (BPSK). The modulated ACK/NACK are spread by a spreading factor (SF)=2 or 4. A plurality of PHICHs may be mapped with the same resource and constitute a PHICH group. The number of PHICHs multiplexed in the PHICH group is determined by the number of spreading codes. The PHICH (group) is repeated three times to obtain diversity gain in the frequency domain and/or the time domain.

The PDCCH is allocated to first n number of OFDM symbols of the subframe, wherein n is an integer greater than 1 and is indicated by the PCIFCH. The PDCCH includes one or more CCEs. The PDCCH notifies each user equipment or user equipment group of information related to resource allocation of transport channels, i.e., a paging channel (PCH) and a downlink-shared channel (DL-SCH), uplink scheduling grant, HARQ information, etc. This information is defined in the form of a downlink control information (DCI) format, and their details are disclosed in the 3GPP standard document.

The paging channel (PCH) and the downlink-shared channel (DL-SCH) are transmitted through the PDSCH. Accordingly, the base station and the user equipment respectively transmit and receive data through the PDSCH except for specific control information or specific service data.

Information as to user equipment(s) (one user equipment or a plurality of user equipments) to which data of the PDSCH are transmitted, and information as to how the user equipment(s) receives and decodes PDSCH data are transmitted by being included in the PDCCH. For example, it is assumed that a specific PDCCH is CRC masked with radio network temporary identity (RNTI) called "A," and information of data transmitted using a radio resource (for example, frequency location) called "B" and transmission format information (for example, transport block size, modulation mode, coding information, etc.) called "C" is transmitted through a specific subframe. In this case, one or more user equipments located in a corresponding cell monitor the PDCCH by using their RNTI information, and if there are one or more user equipments having RNTI called "A", the user equipments receive the PDCCH, and receive the PDSCH indicated by "B" and "C" through information of the received PDCCH.

Hereinafter, the reference signal will be described.

Generally, for channel measurement, a reference signal known by both the transmitting side and the receiving side is transmitted from the transmitting side to the receiving side together with data. This reference signal indicates a modulation scheme as well as channel measurement, whereby a demodulation procedure is performed. The reference signal is divided into a dedicated reference signal (DRS), i.e., user equipment specific reference signal, for the base station and a specific user equipment and a common reference signal (CRS) for all the user equipments.

The CRS which is a cell specific reference signal may be transmitted to the user equipment through a control information region as well as a data information region. Also, the downlink DM-RS which is the user equipment specific reference signal is transmitted through the data region, that is, PDSCH, and unlike the other RS, user equipment specific precoding is applied to the downlink DM-RS, whereby the downlink DM-RS is transmitted to the user equipment.

In order to reduce PDCCH throughput deterioration caused by inter-cell interference, or in order to resolve a lace of resource for the PDCCH, it has been recently suggested that control information is transmitted from the existing PDSCH region, and a channel for transmitting the control information has been be referred to as an enhanced-PDCCH (E-PDCCH). In this case, the PDSCH region refers to a region configured by the other OFDM symbols remaining after some of initial OFDM symbols of the subframe are used for transmission of the PDCCH. Of course, all of the OFDM symbols may be used as the PDSCH region due to no presence of the symbols for transmitting the PDCCH.

The present invention suggests that the OFDM symbols used when the E-PDCCH is transmitted are varied depending on a DCI format of the E-PDCCH or an aggregation level. Hereinafter, it will be apparent that the E-PDCCH may be used even in the case that a relay node (RN) as well as a general UE performs communication with the eNB.

Figure 6:
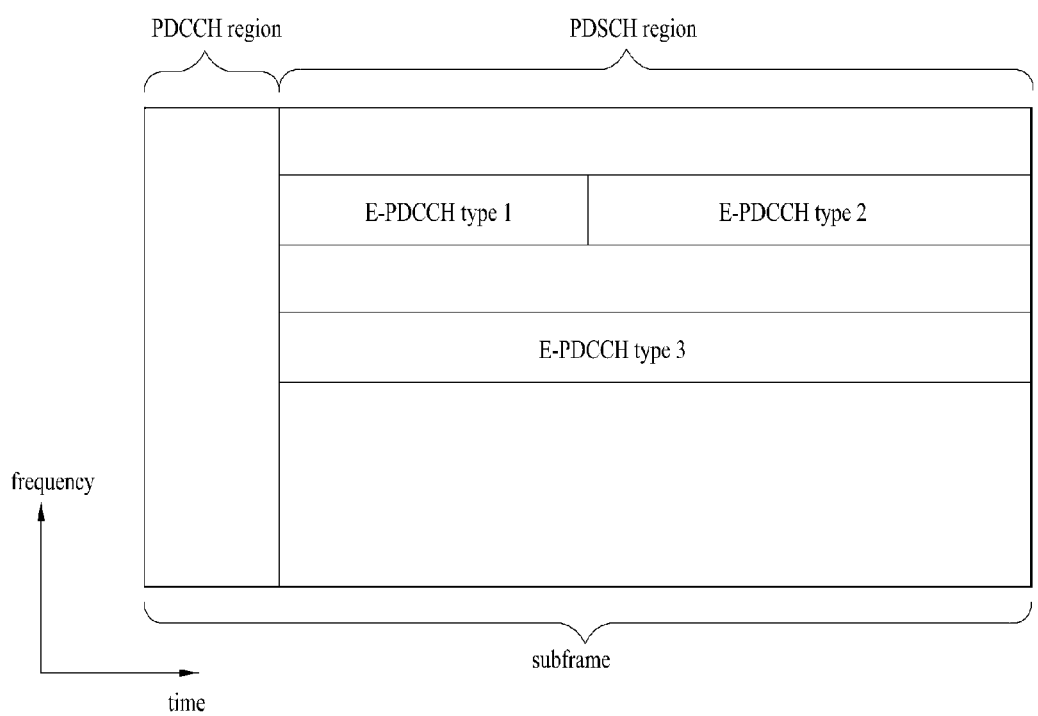
FIG. 6 is a diagram illustrating an example of E-PDCCH transmitted within one subframe in accordance with the embodiment of the present invention.

FIG. 6 is a diagram illustrating an example of E-PDCCH transmitted within one subframe in accordance with the embodiment of the present invention.

Referring to FIG. 5, the E-PDCCH may be transmitted by using some of the OFDM symbols within the PDSCH region, especially only a part of the front of the OFDM symbols, in the same manner as E-PDCCH type 1. For example, the E-PDCCH may be transmitted using the first slot of the subframe. In this case, it is advantageous in that the user equipment UE may decode E-PDCCH fast, acquire scheduling information based on the decoded E-PDCCH and start a proper operation early, for example, a decoding operation of the PDSCH scheduled by the E-PDCCH.

Otherwise, the E-PDCCH may be transmitted by using only a part of the rear of the OFDM symbols in the same manner as E-PDCCH type 2. In this case, it is advantageous in that the symbols which are not used by the E-PDCCH type 1 may be used for signal transmission. For example, the E-PDCCH may be transmitted using the second slot of the subframe.

Otherwise, the E-PDCCH may be transmitted by using all of the OFDM symbols in the same manner as E-PDCCH type 3. In this case, it is advantageous in that the user equipment may enhance resource availability when there is no problem in E-PDCCH decoding.

If more CCEs are aggregated as more resources are required for each E-PDCCH type (that is, if an aggregation level of the E-PDCCH is increased), it is operated that the E-PDCCH is transmitted to a region where different frequency resources, that is, different RBs are aggregated.

First of all, downlink allocation information for transmitting scheduling information for the PDSCH may be transmitted in accordance with the E-PDCCH type 1 so that the user equipment UE may fast decode the E-PDCCH. In this case, the user equipment UE performs blind decoding for a corresponding search area in accordance with the E-PDCCH type 1 to detect control information for scheduling the PDSCH, that is, DCI format 1A. Additionally, the user equipment UE may perform blind decoding to detect different types of DCI formats (for example, DCI formats 2, 2A, 2B, 2C, etc.) in accordance with a predetermined transmission mode. At this time, the E-PDCCH type 1 may be used to maintain the same attributes as those of the DCI format 1A.

In the meantime, in order to schedule the PUSCH in the LTE system, the eNB transmits DCI format 0 to the user equipment UE. In this case, according to the 3GPP standard document, the DCI format 0 has the same bits as those of the DCI format 1A. Accordingly, the user equipment UE may detect the DCI format 0 even without additional blind decoding. In this respect, the present invention suggests that the DCI format 0 corresponding uplink grant is transmitted in accordance with the E-PDCCH type 1 if the DCI format 1A corresponding to downlink allocation information is transmitted in accordance with the E-PDCCH type 1.

The user equipment may perform blind decoding for additional uplink grant as the case may be. For example, the user equipment UE set to perform uplink MIMO operation should perform blind decoding for a corresponding search area to acquire DCI format 4 which is uplink grant for uplink MIMO. According to the 3GPP standard document, since various kinds of information related to MIMO is added to the DCI format 4, the DCI format 4 includes more bits than those of the DCI format 0.

Accordingly, even though additional uplink grant such as the DCI format 4 is transmitted in accordance with the E-PDCCH type 1, since it fails to reduce the number of times for blinding decoding, the present invention suggests that resource availability is increased through the following types of transmission.

1) The additional uplink grant such as the DCI format 4 may be transmitted by using the E-PDCCH type 2. Through this operation, the OFDM symbols remaining after being used by the E-PDCCH type 1 may be used effectively.

2) The additional uplink grant such as the DCI format 4 may be transmitted by using the E-PDCCH type 3. This operation is preferable if more resources are required as additional uplink grant needs more bits.

3) The additional uplink grant such as the DCI format 4 may be transmitted by varying E-PDCCH type depending on the aggregation level. For example, the additional uplink grant may be transmitted in accordance with the E-PDCCH type 1 or 2 in case of the aggregation level 1, and may be transmitted in accordance with the E-PDCCH type 3 in case of the aggregation level 2 or more.

4) Blind decoding may be performed for the additional uplink grant such as the DCI format 4 by assuming two or more E-PDCCH types. For example, it is assumed that the additional uplink grant of the DCI format 4 may be transmitted in accordance with the E-PDCCH types 1 and 2. In this case, resource availability is increased in that a plurality of DCI formats 4 may be multiplexed into one PRB pair. At this time, in order to perform precoding suitable for each E-PDCCH, different DM-RS antenna ports may be used for different E-PDCCH types. The relation between the E-PDCCH type and the DM-RS antenna port may be determined previously or may be notified through an upper layer signal such as RRC signal.

For preferable blind decoding of the aforementioned DCI format 4, the search area for the DCI format 4 may be configured in the frequency resource configured by RB set different from a search area of another DCI format. To this end, the eNB may transmit a separate message for setting the corresponding search area to the user equipment UE through the upper layer signal such as RRC signal.

In addition, the E-PDCCH, which does not schedule the PDSCH, such as the E-PDCCH scrambled with TPC-RNTI for power control, may perform the same operation as that of the E-PDCCH that transmits the aforementioned uplink grant.

It will be apparent that the aforementioned suggestions of the present invention may equally be applied to a method for transmitting downlink allocation information.

Hereinafter, a method for using a reference signal, especially DM-RS, in operating the aforementioned suggestions of the present invention will be described.

First of all, in the same manner as 1) described above, two or more E-PDCCHs may coexist in the same PRB pair. For example, the E-PDCCH of the type 1, which includes downlink allocation information or uplink grant defined by the DCI format 0, may be transmitted to the first slot, and the E-PDCCH of the type 2, which includes uplink grant defined by the DCI format 4, may be transmitted to the second slot.

As described above, although the E-PDCCH multiplexing structure is useful in that the OFDM symbols may be used as much as possible, a problem occurs in that different E-PDCCHs should share the RS with coexisting within the same PRB pair. In particular, in case of the DM-RS precoded by a proper vector and transmitted to each user equipment in accordance with user equipment specific format, since precoding vectors suitable for different user equipments are different from each other, sharing of the RS may be difficult.

Accordingly, if the two E-PDCCHs coexist in one PRB pair, the present invention suggests that antenna ports of DM-RS used for decoding of each E-PDCCH are configured differently from each other. For example, the E-PDCCH type 1 transmitted to the first slot is decoded using RS transmitted to antenna port 7, whereas the E-PDCCH type 2 transmitted to the second slot is decoded using RS transmitted to antenna port 8 to be orthogonal to the E-PDCCH type 1.

Of course, the relation between the E-PDCCH type and the antenna port to be used may be fixed previously, or may be determined by the upper layer signal such as RRC signal. Also, the relation between the E-PDCCH type and the antenna port may be varied per subframe user equipment-specifically.

Figure 7:
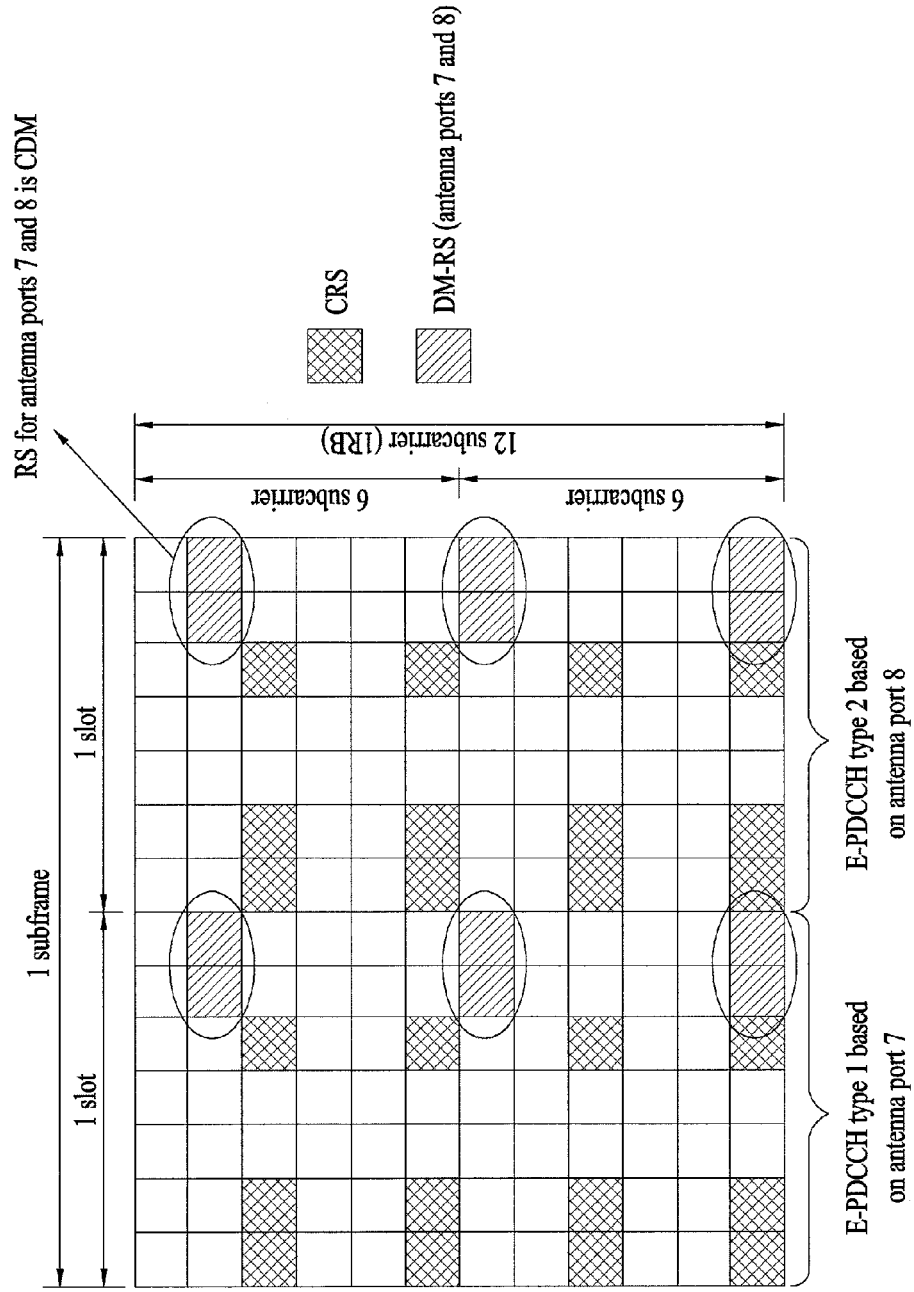
FIG. 7 is a diagram illustrating an example of transmission of a plurality of E-PDCCHs by differently configuring antenna ports of reference signals in accordance with the embodiment of the present invention.

FIG. 7 is a diagram illustrating an example of transmission of a plurality of E-PDCCHs by differently configuring antenna ports of reference signals in accordance with the embodiment of the present invention.

Referring to FIG. 7, it is noted that RE to which CRS is allocated and RE to which DM-RS is allocated exist in the subframe. In particular, it is noted that DM-RS of antenna port 7 and DM-RS of antenna port 9 are subjected to code division multiplexing (CDM).

Accordingly, the user equipment UE may decode the E-PDCCH type 1 transmitted to the first slot by using the DM-RS transmitted to the antenna port 7, whereas the user equipment UE may decode the E-PDCCH type 2 transmitted to the second slot by using the DM-RS transmitted to the antenna port 8 to be orthogonal to the E-PDCCH type 1.

In the aforementioned structure, if the first slot of a specific PRB pair is used for the E-PDCCH for a specific user equipment (for example, if the first slot of a specific PRB pair is used for downlink allocation information for a specific user equipment UE), even though different antenna ports are used for the E-PDCCH (for example, uplink grant of DCI format 4) of the same user equipment UE, which is transmitted from the second slot of the corresponding PRB pair, it is preferable that the DM-RS used for decoding at the first slot is reused.

This is because that it is preferable to transmit the E-PDCCHs of the two slots to the same spatial resource, that is, layer, which has the best signal quality, rather than apply different precodings to the E-PDCCHs of the two slots even though DM-RS ports of the two slots are different from each other as the E-PDCCHs of the two slots are transmitted to the same user equipment UE. Moreover, if the user equipment knows this fact, it is advantageous in that the user equipment may perform more excellent channel estimation through combining of DM-RSs defined by two antenna ports, more specifically coherent combining, under the assumption that the same precoding is applied to the two antenna ports.

Accordingly, the present invention suggests that the same precoding is applied to the two E-PDCCHs if two E-PDCCHs are transmitted from the same PRB pair to a specific user equipment. To this end, the present invention also suggests that the base station applies the same precoding to the two E-PDCCHs.

For example, if the E-PDCCH transmitted from the first slot of the specific PRB pair to the specific user equipment is detected from a specific antenna port P1, it is assumed that the same precoding is applied to the antenna port P1 and another antenna port P2 when another E-PDCCH transmitted from the antenna port P2 is detected from the second slot of the corresponding PRB pair. The base station may also apply the same precoding to the antenna port P1 and the antenna port P2.

Figure 8:
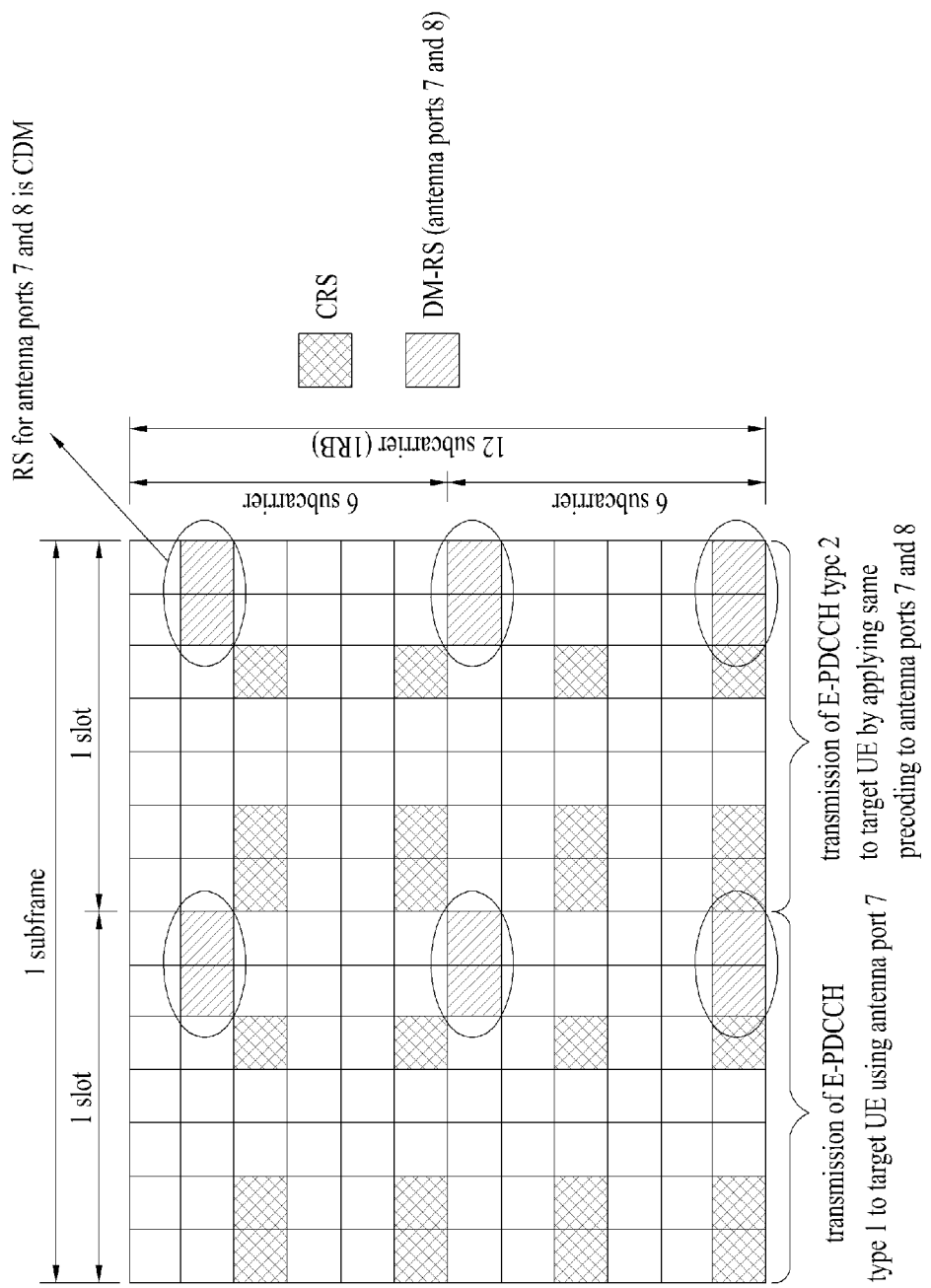
FIG. 8 is a diagram illustrating another example of transmission of a plurality of E-PDCCHs by differently configuring antenna ports of reference signals in accordance with the embodiment of the present invention.

FIG. 8 is a diagram illustrating another example of transmission of a plurality of E-PDCCHs by differently configuring antenna ports of reference signals in accordance with the embodiment of the present invention.

Referring to FIG. 8, it is noted that a target user equipment UE detects the E-PDCCH, which is transmitted from the first slot of the specific PRB pair, from the antenna port 7. In this case, the target user equipment UE may perform blind decoding under the assumption that the same precoding is applied to the antenna port 7 and the antenna port 8 when detecting another E-PDCCH, which is transmitted from the antenna port 8, from the second slot of the corresponding PRB pair.

Also, as described above, the user equipment may perform more excellent channel estimation at the second slot through combining of DM-RSs defined by the antenna port 7 and the antenna port 8.

Hereinafter, under the assumption that the same precoding is applied to different antenna ports used for the respective E-PDCCHs, another embodiment of a method for channel estimation will be described.

Figure 9:
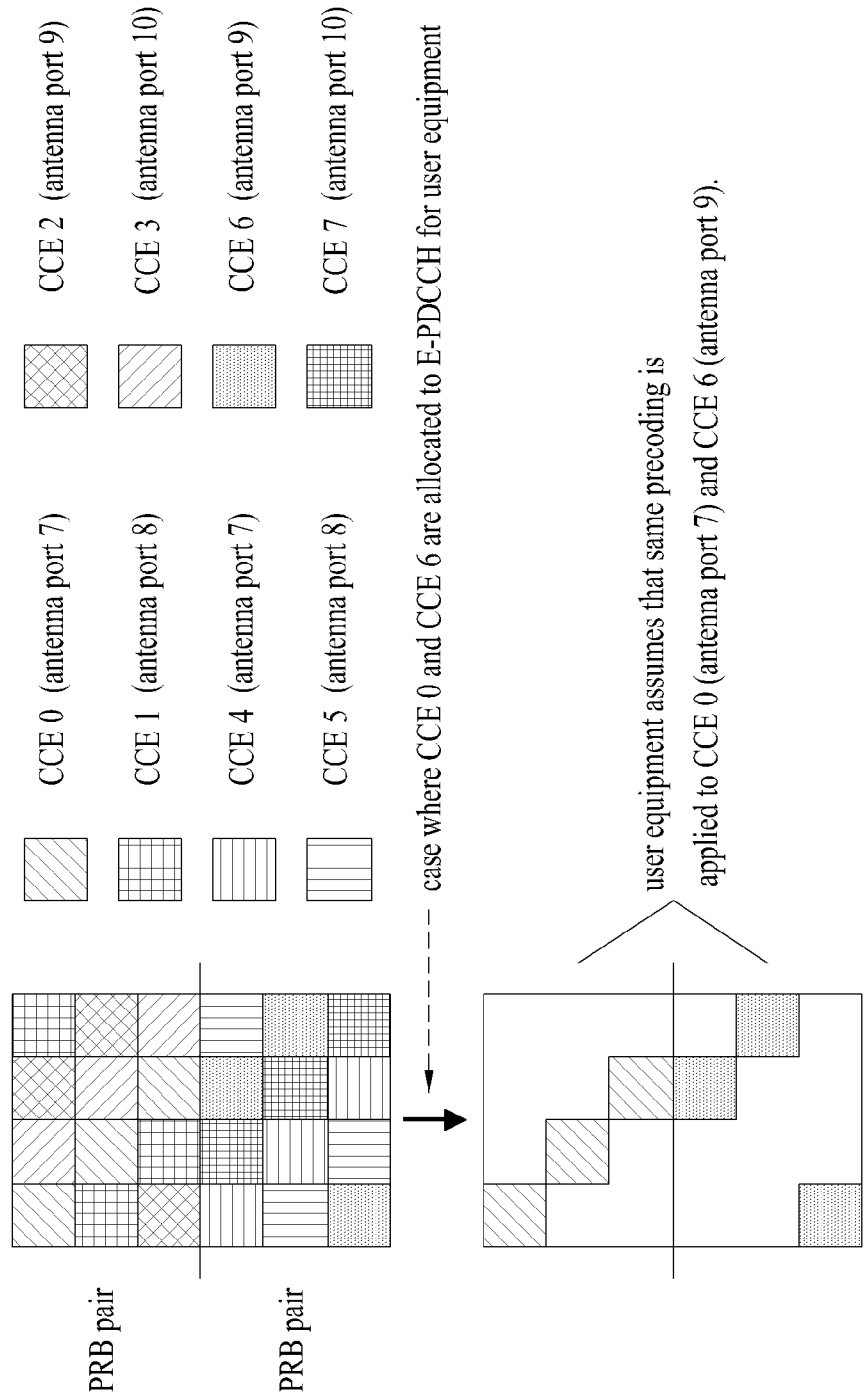
FIG. 9 is a diagram illustrating an example of transmission of E-PDCCH to a single user equipment (UE) by using resources of a plurality of PRB pairs in accordance with the embodiment of the present invention.

FIG. 9 is a diagram illustrating an example of transmission of E-PDCCH to a single user equipment UE by using resources of a plurality of PRB pairs in accordance with the embodiment of the present invention. In particular, it is assumed in FIG. 9 that two PRB pairs are used and antenna ports of RSs used for each PRB pair are different from each other.

Referring to FIG. 9, one PRB pair is identified by four resource regions (marked with CCEs), and different antenna ports are allocated to the respective resource regions, that is, CCEs. In this case, the eNB transmits the E-PDCCH to the user equipment UE by using two CCEs existing in two PRB pairs adjacent to each other. At this time, one E-PDCCH may be transmitted using the two CCEs, or each of two E-PDCCHs may be transmitted by using one CCE.

Even in the case, if the plurality of PRB pairs are spaced apart from each other within a certain frequency level, channel estimation may be performed under the assumption that the same precoding is applied to the resource region existing in the plurality of PRB pairs.

In this case, the certain frequency level means a distance level that may assume the same precoding as the two PRB pairs are sufficiently close to each other. That is, if the certain frequency level is given by a predetermined value N and PRB pair smaller than or equal to N exists between the two PRB pairs, the same precoding may be assumed.

For example, if N is given by 0, it means that the same precoding may be assumed for the two PRB pairs only if the PRB pairs should be adjacent to each other on PRB index. If N is given by 1, it means that demodulation may be performed under the assumption that the same precoding may be applied to the two PRB pairs spaced apart from each other as much as one PRB pair (that is, as much as 12 subcarriers). This N value may be given equally to a size of a resource block group (RBG) which is a resource allocation unit for the PDSCH that includes a plurality of RBs. Alternatively, the N value may be determined by a parameter such as the number of reserved antenna ports to be used by the E-PDCCH or the number of CCEs existing within a single PRB pair.

In FIG. 9, in demodulating CCE 0 existing in an upper PRB pair and CCE 6 existing in a lower PRB pair, it is assumed that the user equipment UE performs channel estimation by combining RSs of two antenna ports of which indexes are different from each other as 7 and 9 under the assumption that the same precoding is applied to the PRB pairs. In this case, the distance between the PRB pairs that may assume the same precoding may be given by 0. This means that the same precoding may be applied to only the PRB pairs adjacent to each other as described above. Alternatively, the distance between the PRB pairs to which the same precoding is applied may be set to 1 or 2 to increase an application range of PRB bundling.

Figure 10:
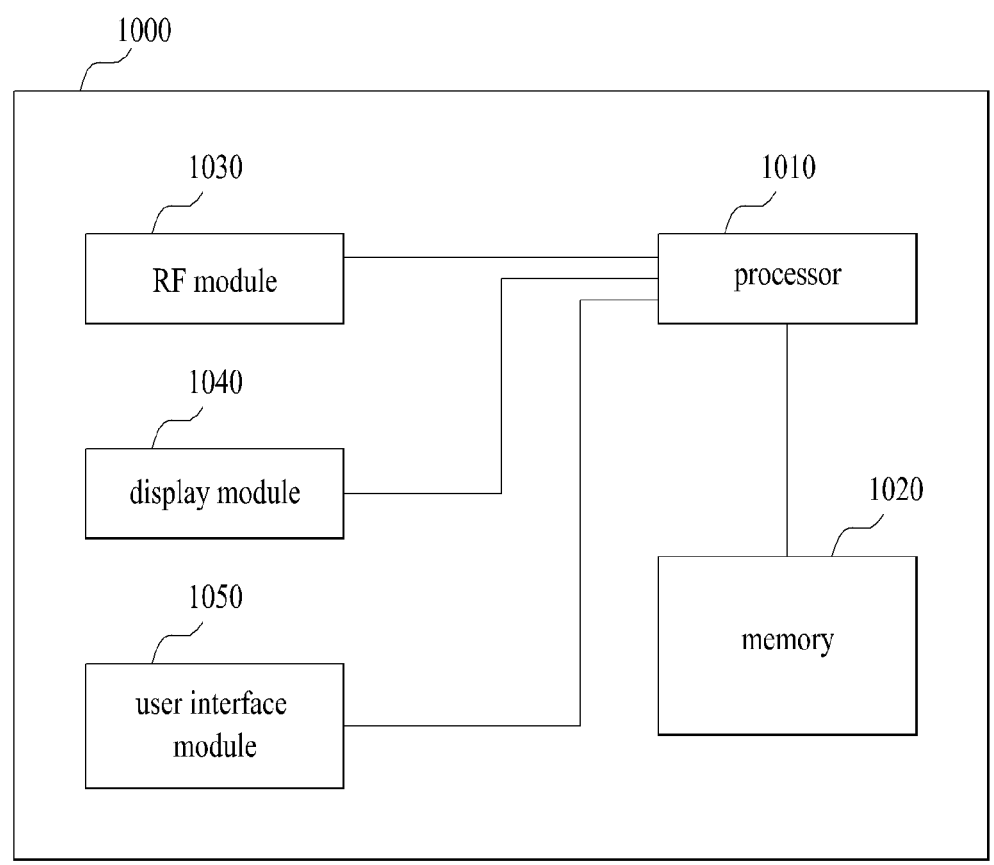
FIG. 10 is a block diagram illustrating a communication device according to the embodiment of the present invention.

FIG. 10 is a block diagram illustrating a communication device according to the embodiment of the present invention.

Referring to FIG. 10, the communication apparatus 1000 includes a processor 1010, a memory 1020, a radio frequency (RF) module 1030, a display module 1040, and a user interface module 1050.

The communication device 1000 is illustrated for convenience of description, and some of its modules may be omitted. Also, the communication device 1000 may further include necessary modules. Moreover, some modules of the communication apparatus 1000 may be divided into segmented modules. The processor 1010 is configured to perform the operation according to the embodiment of the present invention illustrated with reference to the drawings. In more detail, a detailed operation of the processor 1010 will be understood with reference to the disclosure described with reference to FIG. 1 to FIG. 9.

The memory 1020 is connected with the processor 1010 and stores an operating system, an application, a program code, and data therein. The RF module 1030 is connected with the processor 1010 and converts a baseband signal to a radio signal or vice versa. To this end, the RF module 1030 performs analog conversion, amplification, filtering and frequency uplink conversion, or their reverse processes. The display module 1040 is connected with the processor 1010 and displays various kinds of information. Examples of the display module 1040 include, but not limited to, a liquid crystal display (LCD), a light emitting diode (LED), and an organic light emitting diode (OLED). The user interface module 1050 is connected with the processor 1010, and may be configured by combination of well known user interfaces such as keypad and touch screen.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments according to the present invention may be implemented by various means, for example, hardware, firmware, software, or their combination. If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Although the aforementioned method for transmitting and receiving downlink control information in a wireless communication system and the device therefor have been described based on the 3GPP LTE system, they may be applied to various wireless communication systems in addition to the 3GPP LTE system.

The invention claimed is:

1. A method for receiving downlink control information from a base station at a user equipment in a wireless communication system, the method comprising:
receiving, by the user equipment, first control information in a first physical resource block (PRB) pair of a specific subframe using a first antenna port transmitting a first reference signal; and
receiving, by the user equipment, second control information in a second PRB pair of the specific subframe using a second antenna port transmitting a second reference signal,
wherein a same precoding is applied to the first reference signal and the second reference signal, when a distance between the first PRB pair and the second PRB pair is equal to or smaller than a predetermined value in a unit of frequency, and
wherein a different precoding is applied to the first reference signal and the second reference signal, when the distance between the first PRB pair and the second PRB pair is greater than the predetermined value in the unit of frequency.

2. The method according to claim 1, further comprising:
performing channel estimation for the second PRB pair by combining the first reference signal and the second reference signal,
wherein the first control information is received in a first area of the first PRB pair and, and
wherein the second control information is received in a second area of the second PRB pair.

3. The method according to claim 1, wherein the second control information transmitted using the same layer as the first control information is transmitted.

4. The method according to claim 2, wherein the first reference signal and the second reference signal are mapped into a predetermined area of the specific subframe through code division multiplexing.

5. The method according to claim 1, wherein the first control information received in the first PRB pair and the second control information received in the second PRB pair correspond to one downlink control information.

6. The method according to claim 1, wherein each of the first control information received in the first PRB pair and the second control information received in the second PRB pair corresponds to separate downlink control information for the user equipment.

7. The method according to claim 2, wherein the first area is a first slot of the specific subframe, and the second area is a second slot of the specific subframe.

8. The method according to claim 1, wherein the predetermined value in unit of the frequency corresponds to one resource block or two resource blocks.

9. A user equipment in a wireless communication system, the user equipment comprising:
a wireless communication module configured to transmit and receive a signal to and from a base station; and
a processor operatively connected to the wireless communication module and configured to process the signal,
wherein the processor is further configured to control the wireless communication module to:
receive first control information in a first physical resource block pair (PRB) of a specific subframe using a first antenna port transmitting a first reference signal, and
receive second control information in a second PRB of the specific subframe using a second antenna port transmitting a second reference signal,
wherein a same precoding is applied to the first reference signal and the second reference signal, when a distance between the first PRB pair and the second PRB pair is equal to or smaller than a predetermined value in a unit of frequency, and
wherein a different precoding is applied to the first reference signal and the second reference signal, when the distance between the first PRB pair and the second PRB pair is greater than the predetermined value in the unit of frequency.

10. The user equipment according to claim 9, wherein the processor performs channel estimation for the second PRB by combining the first reference signal and the second reference signal,
wherein the first control information is received in a first area of the first PRB pair and, and
wherein the second control information is received in a second area of the second PRB pair.

11. The user equipment according to claim 9, wherein the second control information transmitted using the same layer as the first control information is transmitted.

12. The user equipment according to claim 10, wherein the first reference signal and the second reference signal are mapped into a predetermined PRB pair of the specific subframe through code division multiplexing.

13. The user equipment according to claim 9, wherein the first control information received in the first PRB air and the second control information received in the second PRB pair correspond to one downlink control information.

14. The user equipment according to claim 9, wherein each of the first control information received in the first PRB pair and the second control information received in the second PRB pair corresponds to separate downlink control information for the user equipment.

15. The user equipment according to claim 10, wherein the first area is a first slot of the specific subframe, and the second area is a second slot of the specific subframe.

16. The user equipment according to claim 9, wherein the predetermined value in the unit of the frequency corresponds to one resource block or two resource blocks.

* * * * *